(12) United States Patent
Ni et al.

(10) Patent No.: US 9,354,345 B2
(45) Date of Patent: May 31, 2016

(54) METHOD AND DEVICE FOR DYNAMIC CONTROL OF DELAYS IN GUN CONTROLLER

(71) Applicant: CGG SERVICES SA, Massy (FR)

(72) Inventors: Yuan Ni, Antony (FR); Risto Siliqi, Paris (FR); Cheikh Niang, Saint Cyr l'Ecole (FR)

(73) Assignee: CGG SERVICES SA, Massy (FR)

( * ) Notice: Subject to any disclaimer, the term of this patent is extended or adjusted under 35 U.S.C. 154(b) by 425 days.

(21) Appl. No.: 13/923,519

(22) Filed: Jun. 21, 2013

(65) Prior Publication Data

US 2014/0034412 A1 Feb. 6, 2014

Related U.S. Application Data

(60) Provisional application No. 61/678,688, filed on Aug. 2, 2012.

(51) Int. Cl.
*G01V 1/38* (2006.01)
*G01V 1/08* (2006.01)

(52) U.S. Cl.
CPC .............. *G01V 1/3808* (2013.01); *G01V 1/08* (2013.01); *G01V 2200/12* (2013.01)

(58) Field of Classification Search
CPC ....... G01V 1/006; G01V 1/3808; G01V 1/08; G01V 2210/12
See application file for complete search history.

(56) References Cited

U.S. PATENT DOCUMENTS

| 3,079,601 A | 2/1963 | Carter et al. | |
|---|---|---|---|
| 3,602,878 A * | 8/1971 | Sullivan | 367/23 |
| 3,687,218 A | 8/1972 | Ritter | |

(Continued)

FOREIGN PATENT DOCUMENTS

| GB | 2130724 A | 6/1984 |
|---|---|---|
| GB | 2432421 A | 5/2007 |

OTHER PUBLICATIONS

Search Report in corresponding Singapore Application No. 2013059209 mailed Oct. 10, 2014.

(Continued)

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

A method controls a delay of an air-gun in an aquatic seismic source. The method includes a step of receiving an attribute of the air-gun during the aquatic seismic survey; a step of calculating, based on a time-delay algorithm that uses the attribute, the asynchronization time of the air-gun; a step of determining whether the asynchronization time is smaller than a given time threshold; a step of instructing a controller to (1) wait for a predetermined time before calculating again the asynchronization time of the air-gun if the asynchronization time is smaller than the given time threshold, or (2) calculate an updated asynchronization time for the air-gun based on the attribute if the asynchronization time is larger than the given time threshold; and a step of sending the updated asynchronization time to a gun controller of the air-gun for adjusting a delay time for firing the air-gun.

20 Claims, 6 Drawing Sheets

(56) References Cited

U.S. PATENT DOCUMENTS

| | | | |
|---|---|---|---|
| 3,893,539 A * | 7/1975 | Mott-Smith | 181/115 |
| 4,106,585 A | 8/1978 | Huizer | |
| 4,300,653 A | 11/1981 | Cao et al. | |
| 4,476,553 A | 10/1984 | Ziolkowski et al. | |
| 8,174,927 B2 | 5/2012 | Hopperstad et al. | |
| 2010/0265795 A1 * | 10/2010 | Johnson et al. | 367/32 |
| 2010/0302902 A1 | 12/2010 | Nance et al. | |

OTHER PUBLICATIONS

Written Opinion in corresponding Singapore Application No. 2013059209 mailed Oct. 10, 2014.

British Search Report mailed Dec. 23, 2013, in related British Application No. GB1313876.3.

Singapore Search and Examination Report in corresponding Singapore Application No. 2013059209 dated Apr. 13, 2015.

* cited by examiner

METHOD AND DEVICE FOR DYNAMIC CONTROL OF DELAYS IN GUN CONTROLLER

CROSS REFERENCE TO RELATED APPLICATIONS

This application claims priority and benefit from U.S. Provisional Patent Application No. 61/678,688, filed Aug. 2, 2012, for "Dynamic Control of Delay of Guns in Gun-Controller," the entire content of which is incorporated in its entirety herein by reference.

BACKGROUND

1. Technical Field

Embodiments of the subject matter disclosed herein generally relate to methods and devices for dynamically controlling the shooting of air guns of a marine source array.

2. Discussion of the Background

Reflection seismology is a method of geophysical exploration to determine the properties of a portion of a subsurface layer in the earth, which is information especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, commonly used seismic sources are essentially impulsive (e.g., air guns that hold compressed air that is suddenly allowed to expand). An air gun produces a high amount of acoustics energy over a short time. Such a source is towed by a vessel at a certain depth along direction X. The acoustic waves from the air gun propagate in all directions. The air gun instantaneously releases large peak acoustic pressures and energy. Such a source is illustrated in FIG. 1. This figure shows a source array 104 being towed behind a vessel 101. When the source array is activated, acoustic energy is coupled into the water and transmitted into the earth, where part of the energy is partially reflected back from the ocean bottom 113 and from rock formation interfaces 112 (rock layer that has a change in acoustic impedance). Sensors or receivers 106 used to record the reflected energy include hydrophones, geophones and/or accelerometers. The receivers can be encapsulated in either fluid filled or solid streamers 105 that are also towed by vessels at shallow depth.

Returning to the air guns, an air gun stores compressed air and releases it suddenly underwater when fired. The released air forms a bubble (which may be considered spherical), with air pressure inside the bubble initially greatly exceeding the hydrostatic pressure in the surrounding water. The bubble expands, displacing the water and causing a pressure disturbance that travels through the water. As the bubble expands, the pressure decreases, eventually becoming lower than the hydrostatic pressure. When the pressure becomes lower than the hydrostatic pressure, the bubble begins to contract until the pressure inside again becomes larger than the hydrostatic pressure. The process of expansion and contraction may continue through many cycles, thereby generating a pressure (i.e., seismic) wave. The pressure variation generated in the water by a single source (which can be measured using a hydrophone or geophone located near the air gun) as a function of time is called the near-field signature and is illustrated in FIG. 2. A first pressure increase due to the released air is called primary pulse and it is followed by a pressure drop known as a ghost. Between highest primary pressure and lowest ghost pressure there is a peak pressure variation (P-P). The pulses following the primary and the ghost are known as a bubble pulse train. The pressure difference between the second pair of high and low pressures is a bubble pressure variation $P_b$-$P_b$. The time T between pulses is the bubble period.

Single air guns are not practical because they do not produce enough energy to penetrate at desired depths under the seafloor, and plural weak oscillations (i.e., the bubble pulse train) following the primary (first) pulse complicates seismic data processing. These problems are overcome by using arrays of air guns, generating a larger amplitude primary pulse and canceling secondary individual pulses by destructive interference.

FIG. 2 represents a situation in which the bubble generated by a single air gun drifts slowly toward the surface, surrounded by water having the hydrostatic pressure constant or slowly varying as the bubble slowly drifts upward. However, when another air gun is fired simultaneously in proximity to the first air gun, the hydrostatic pressure is no longer constant or slowly varying. The bubbles of neighboring guns affect each other.

A source array includes plural individual wave sources. An individual wave source may be an air gun or a cluster of air guns. Since the dimensions of the source array, including plural individual sources, are comparable with the generated wave's wavelength, the overall wave generated by the source array is directional, i.e., the shape of the wave, or its signature varies with the direction until, at a great enough distance, the wave starts having a stable shape. After the shape become stable, the amplitude of the wave decreases inversely proportional to the distance. The region where the signature shape no longer changes significantly with distance is known as the "far-field," in contrast to the "near-field" region where the shape varies. Knowledge of the wave source's far-field signature is desirable in order to extract information about the geological structure generating the detected wave upon receiving the far-field input wave.

In order to estimate the source array's far-field signature, an equivalent notional signature for each individual source may be calculated for each of the guns using near-field measurements (see e.g., U.S. Pat. No. 4,476,553 incorporated herewith by reference). The equivalent notional signature is a representation of an amplitude due to an individual wave source as a function of time, the source array's far-field signature being a superposition of the notional signatures corresponding to each of the individual sources. In other words, the equivalent notional signature is a tool for representing the contribution of an individual source to the far-field signature, such that the individual source contribution is decoupled from contributions of other individual wave sources in the source array.

However, the stability and reliability of the far-field signature depends on the stability of each of the individual wave sources and of the source array's geometry. During a seismic survey, the individual wave sources' behavior may change (e.g., firing later or earlier than expected, than desirable, or at a smaller amplitude than nominally designed) and thus affect the far-field source signature. In practice, the gun controllers use a sensor called time-break (hereby called TB) installed inside each air-gun body to monitor the launch of each gun. However, for guns of different sizes, different models and/or different service time and maintenance conditions, the delay between the launch (electrical signal sent to gun and valve begins to open) and the actual shot (air goes out of the gun body and begins to generate the shock wave of FIG. 2) may vary.

It would be desirable to have methods and apparatuses capable of controlling and adjusting the firing of the individual wave sources of a marine source array so that all the individual wave sources are fired at the same time, thus, resulting in an improved far-field signature.

SUMMARY

According to an embodiment, there is a method for a delay of an air-gun (310) in a marine seismic source during a marine seismic survey. The method includes receiving an attribute of the air-gun during the marine seismic survey, wherein the attribute is indicative of an asynchronization time of the air-gun; calculating, based on a time-delay algorithm that uses the attribute, the asynchronization time of the air-gun, wherein the asynchronization time is a time difference between (i) a desired time when the air-gun is expected to fire and (ii) an actual time when the air-gun actually fires; determining whether the asynchronization time is smaller than a given time threshold; instructing a controller to (1) wait for a predetermined time before calculating again the asynchronization time of the air-gun if the asynchronization time is smaller than the given time threshold, or (2) calculate an updated asynchronization time for the air-gun based on the attribute if the asynchronization time is larger than the given time threshold; and sending the updated asynchronization time to a gun controller of the air-gun for adjusting a delay time for firing the air-gun.

According to another embodiment, there is a computing device for controlling a delay of an air-gun in a marine seismic source during a marine seismic survey. The computing device includes an interface for receiving an attribute of the air-gun during the marine seismic survey, wherein the attribute is indicative of an asynchronization time of the air-gun; and a processor connected to the interface. The processor is configured to calculate, based on a time-delay algorithm that uses the attribute, the asynchronization time of the air-gun, wherein the asynchronization time is a time difference between (i) a desired time when the air-gun is expected to fire and (ii) an actual time when the air-gun actually fires; determine whether the asynchronization time is smaller than a given time threshold; instruct the computing device to (1) wait for a predetermined time before calculating again the asynchronization time of the air-gun if the asynchronization time is smaller than the given time threshold, or (2) calculate an updated asynchronization time for the air-gun based on the attribute if the asynchronization time is larger than the given time threshold; and send the updated asynchronization time to a gun controller of the air-gun for adjusting a delay time for firing the air-gun.

According to another exemplary embodiment, there is a computer readable media non-transitorily storing executable codes which when executed on a computer make the computer perform a method as noted above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic marine source array having plural air guns. However, the embodiments to be discussed next are not limited to air guns, but may be applied to other types of seismic sources. Further, the source array may be used in an aquatic environment, i.e., in a river, lake, pond or other body of water, i.e., any body of water that does not have salt water.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, plural air guns are used to form a seismic source array. The air guns are controlled by one or more air-gun controllers. These controllers are configured to control a firing of the guns based on, for example, a near-field signature and not based only on the time-break.

Figure 1:
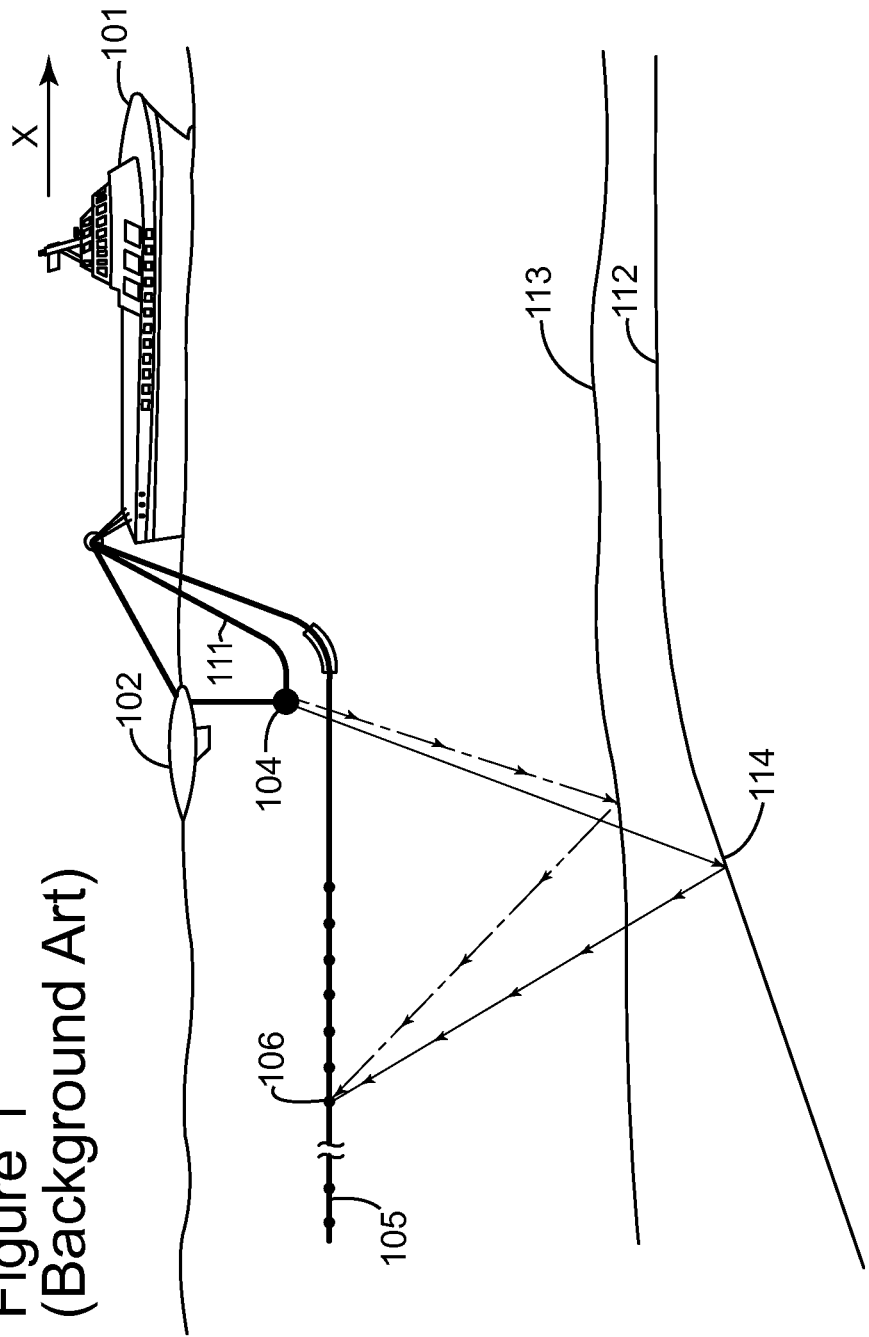
FIG. 1 illustrates a conventional seismic survey system.
Figure 2:
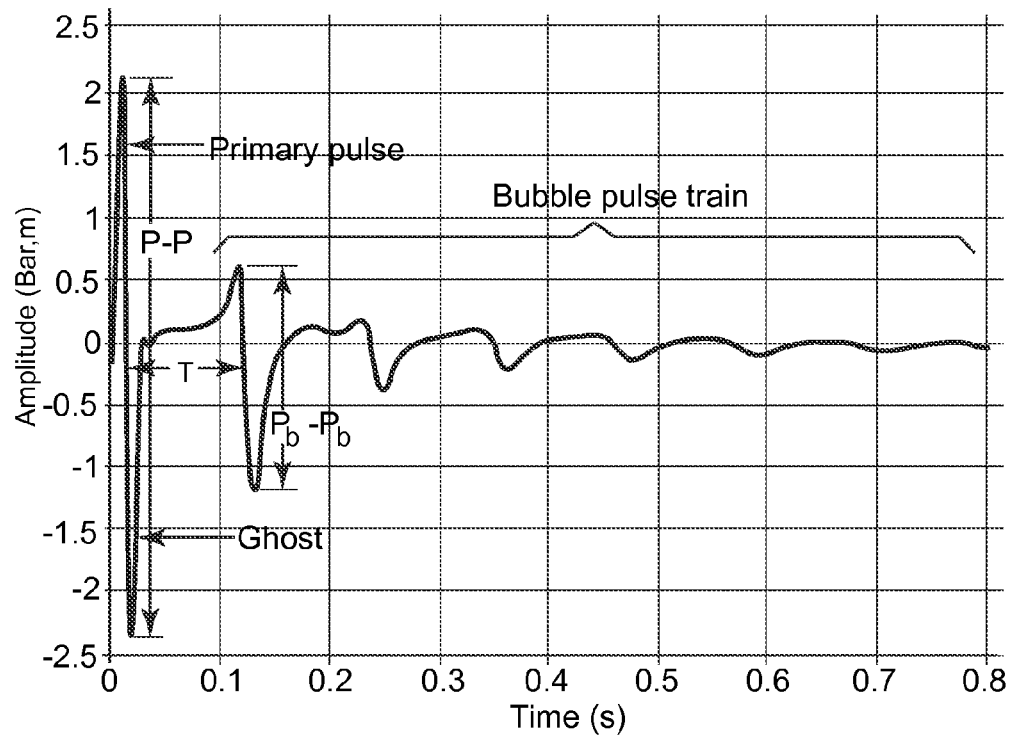
FIG. 2 is a graph illustrating a time variation of a pressure when a gun is fired.
Figure 3:
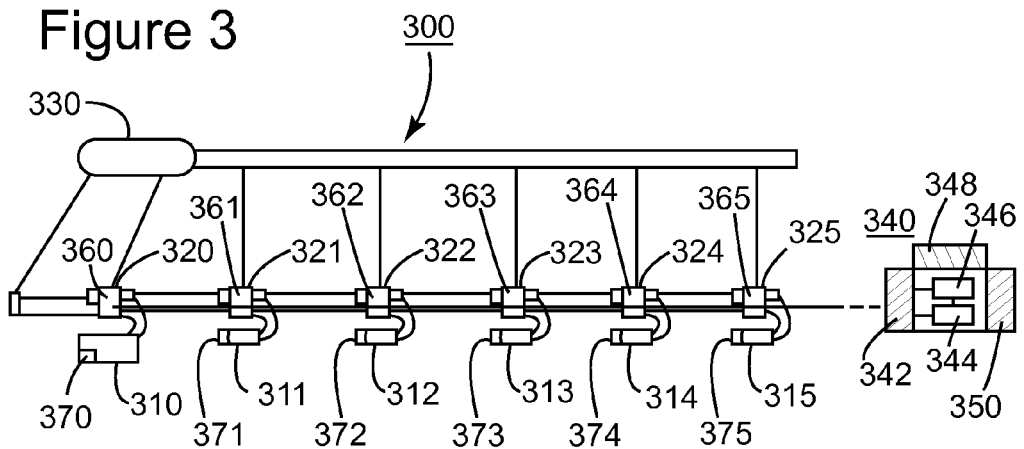
FIG. 3 illustrates a marine source array and a seismic data processing unit according to an embodiment.

In this respect, FIG. 3 illustrates a marine source array 300 including guns 310, 311, 312, 313, 314, and 315 and near-field sensors 320, 321, 322, 323, 324, and 325, which may be located near (e.g., above) the individual sources 310-315, respectively. The near-field sensors 320-325 may be hydrophones or geophones. The number and arrangement of the individual sources are merely exemplary and are not intended to be limiting. Each of the guns 310-315 may be a single air gun or a cluster of air guns. The near-field sensors 320-325 may be located at about 1 m above the air gun 310-315. The distance in-between neighboring air guns may be about 3 m. The marine source array 300 may include also a float 330 for supporting the guns to a desired depth.

Near-field sensors 320-325 are connected to a seismic data processing unit 340 (e.g., located on the towing vessel), including an interface 342, a processor 344 and a memory 346. The seismic data processing unit 340 may also include a monitoring unit 348 and a display 350. In one application, the processing unit 340 is the gun controller. In another application, each gun has its own gun controller 360-365, mounted next to the gun. The gun controllers 360-365, if installed next to their corresponding guns, may be configured to communicate via an interface 342 with the seismic data processing unit 340, e.g., for receiving instructions from the processing unit 340 and/or for providing information to the processing unit.

As noted in the Background section, the conventional methods for controlling the firing of the air guns rely on the TB provided by a sensor provided inside the air guns. For illustration purposes, TB sensors 370 to 375 are shown in FIG. 3 being located inside corresponding guns. This method is not reliable as already discussed.

In certain situations, at the beginning of a survey, several test shots are made to estimate delays between sending the firing signal to the gun and the effective shot of the gun. Based on these measured delays, the gun controllers are configured with fixed time delays. A time delay is related to a time difference between (i) a desired time when the air-gun 310 is expected to fire and (ii) an actual time when the air-gun 310 actually fires. However, this method is inefficient and may produce erroneous results in certain situations.

Thus, according to an embodiment, the time delays that are input to the gun controllers are dynamically calculated/adjusted during the seismic survey, for each individual air gun so that each gun controller has a customized time delay that is best applicable to its corresponding air gun. Various methods may be used to calculate adjustments (asynchronization times) for the time delays. For example, one possibility is to use signals recorded by the near-field sensors and to calculate the asynchronization times based on the near-field signals and not based on the TB signals. The asynchronization times may be positive or negative, i.e., they may need to be added or subtracted from the exiting delay times. Other methods are known in the art for calculating asynchronous time, one of which is described in patent application Ser. No. 13/766,157, "Method and Device for Detecting Faults in a Marine Source Array," which is assigned to the same assignee as the present application. This application is incorporated herein by reference in its entirety.

Figure 4:
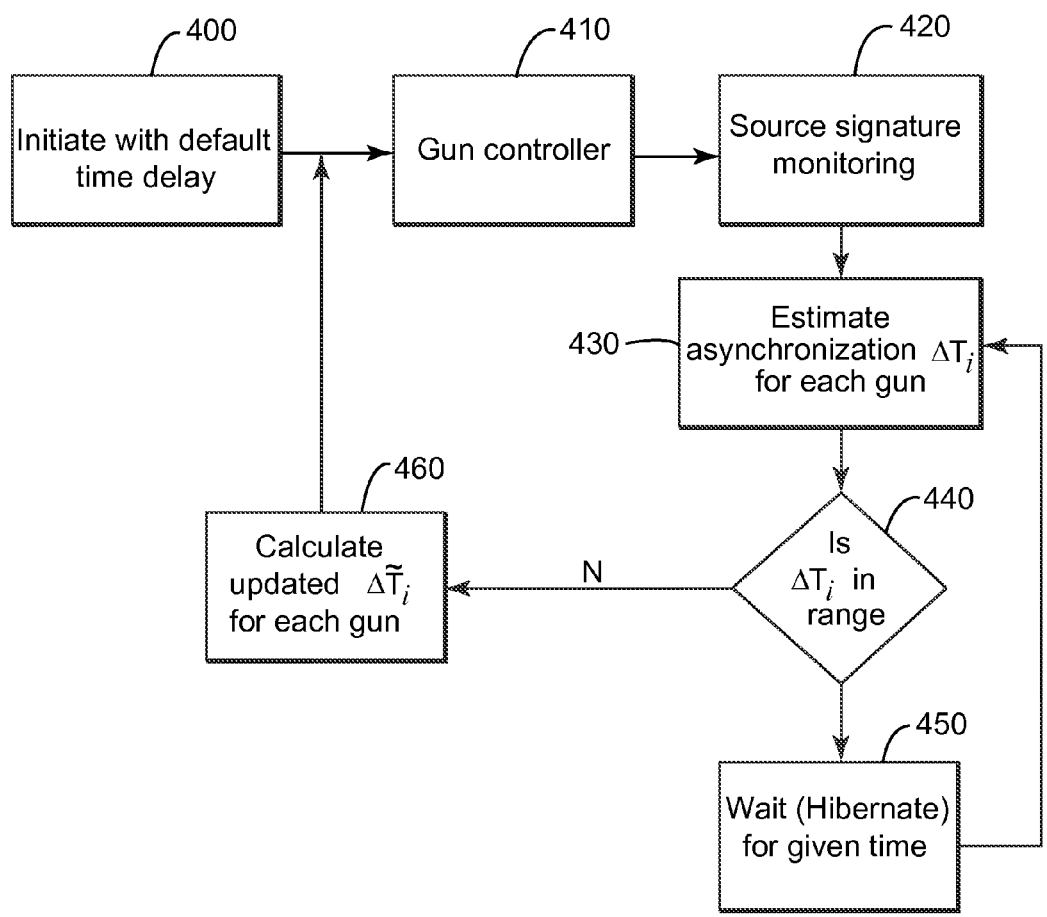
FIG. 4 is a loop used to update a delay time of an air gun according to an embodiment.

In one embodiment a control loop of a gun controller with signature monitoring is illustrated in FIG. 4. The gun controller of a given gun is configured at the beginning of the seismic survey to have a default time delay. The process illustrated in FIG. 4 is equally applicable to all the gun controllers if the seismic source has multiple gun controllers or to a single gun controller if the seismic source has a single gun controller. Thus, in step 400, the processing unit 340 or the operator of the survey initiate the system with a default delay time for a given gun. The time delay is transmitted in step 410 to the gun controller (e.g., 360). The gun controller applies the received delay time to its corresponding gun when firing it. In step 420, the source signature is monitored, for example, by measuring the near-field signature, the TB, and/or other attributes of the source. For example, an attribute of the source may be the position of each gun in the sub-array, which may be monitored with a Global Positioning System (GPS), the depth of each gun, which may be monitored, etc.

The data collected in step 420 may be transmitted to each gun-controller or to the processing unit 340 for estimating, in step 430, an asynchronization time OT, for each gun "i". This step may take place only in the processing unit 340, or only in the gun-controllers, or it may be distributed among the gun-controllers and the processing unit. The asynchronization time $\Delta T_i$ is calculated based on various methods, e.g., based on the near-field sensor signals, the TB, and/or other attributes. For example, it is possible to detect the time of the half maximum of the TB data from gun i relative to the gun controller set time as $\Delta T_i$, or make a cross-correlation between the single gun source signature reversed from near-field hydrophone data and a reference signature to determine a delay as $\Delta T_i$. In step 440, the asynchronization time $\Delta T_i$ is compared with a threshold value to determine whether it is in range or not. The threshold value is determined by the seismic survey's operator, based on various considerations, e.g., experience, the type of guns, the size of the guns, their age, their maintenance status, the desired quality of the final image of the survey, the duration of the survey, the depth of the investigated subsurface, etc.

If a determination is made in step 440 that the asynchronization time $\Delta T_i$ is in range, e.g., smaller than the threshold value, the process advances to step 450. The determination may be deterministic or probabilistic. An example of deterministic determination is to calculate the average value of $\Delta T_i$ in the last N shots and compare to a threshold $\Delta T_0$, which could be a pre-defined value according to gun type, or defined by the gun synchronization stability based on field measurement. An example of probabilistic determination is to calculate the trend of $\Delta T_i$ over the last N shots to predict the asynchronization time for the next shot, and then compare to a threshold as described in the deterministic determination example. No correction is made to the original delay times used by the gun controller in step 410. The system is now instructed to wait (hibernate) for a given time (e.g., seconds to minutes) and then to return to step 430 to again estimate the asynchronization time $\Delta T_i$.

However, if a determination in step 440 is made that the asynchronization time $\Delta T_i$ is larger than the threshold value, the process advances to step 460 for calculating an updated asynchronization time $\Delta \tilde{T}_i$ to be sent to the controller in step 410.

The updated asynchronization time $\Delta \tilde{T}_i$ may use a different algorithm than the one used in step 430. One such example is to set $\Delta \tilde{T}_i = \text{sign}(\Delta T_i) * \Delta t$, where sign is the signum function and $\Delta t$ is the gun controller time resolution. Another example is to set $\Delta \tilde{T}_i = \Delta T_i / 2$ so as to avoid over correction. In other words, step 430 may use a simplified algorithm for estimating the asynchronization time $\Delta T_i$ so that the overall process is fast. If the determination in step 440 indicates that the gun controller's delay time need to be adjusted, then a full calculation of the updated asynchronization time $\Delta \tilde{T}_i$ is performed and this value is sent to the gun controller. In one application, the same algorithm is used in steps 430 and 460 and thus, for this application, the updated asynchronization time $\Delta \tilde{T}_i$ is the same as the asynchronization time $\Delta T_i$.

The gun controller then updates the existing delay time with the corresponding asynchronization time $\Delta \tilde{T}_i$, i.e., adding or subtracting the asynchronization time from the old delay time to obtain a new delay time. The addition or subtraction is determined by the method used in steps 430 and/or 460, where examples have been given in the previous paragraphs. In this way, the delay time applied by each controller to its corresponding gun is dynamically controlled while the seismic survey is performed. Note that as a result of the determination step 440, one or more guns of the source array may be deemed necessary to be updated with a new time delay.

If a decision is made to update the delay time of a gun controller, in one application the updated asynchronization time $\Delta \tilde{T}_i$ is directly sent to gun "i". In another application, a minimum adjustable time $\Delta t$ is sent to the gun controller. The minimum adjustable time $\Delta t$ may be used across all the gun controllers for a faster adjustment of the shots (as no calculations are involved). In one application, there is an automatic interface that receives measurements, calculates new times and sends updated time delays to the gun controllers so that the loop process illustrated in FIG. 4 is run continuously and automatically during the seismic survey. A computing device that supports such functionality is discussed later.

In one application, a delay time of each air-gun of the seismic source is dynamically adjusted during the seismic survey. In still another application, a first delay time of a first air-gun of the seismic source is dynamically adjusted with a different value than a second delay time of a second air-gun of the seismic source. In yet another application, the various air-guns of the seismic source are updated at different times during the seismic survey. The above algorithm is advantageous because it does not depend on the mechanism of the gun controller, i.e., it can be applied to gun controllers irrespective of their manufacturer. Also, the mechanism may be implemented in existing gun controllers.

Figure 5:
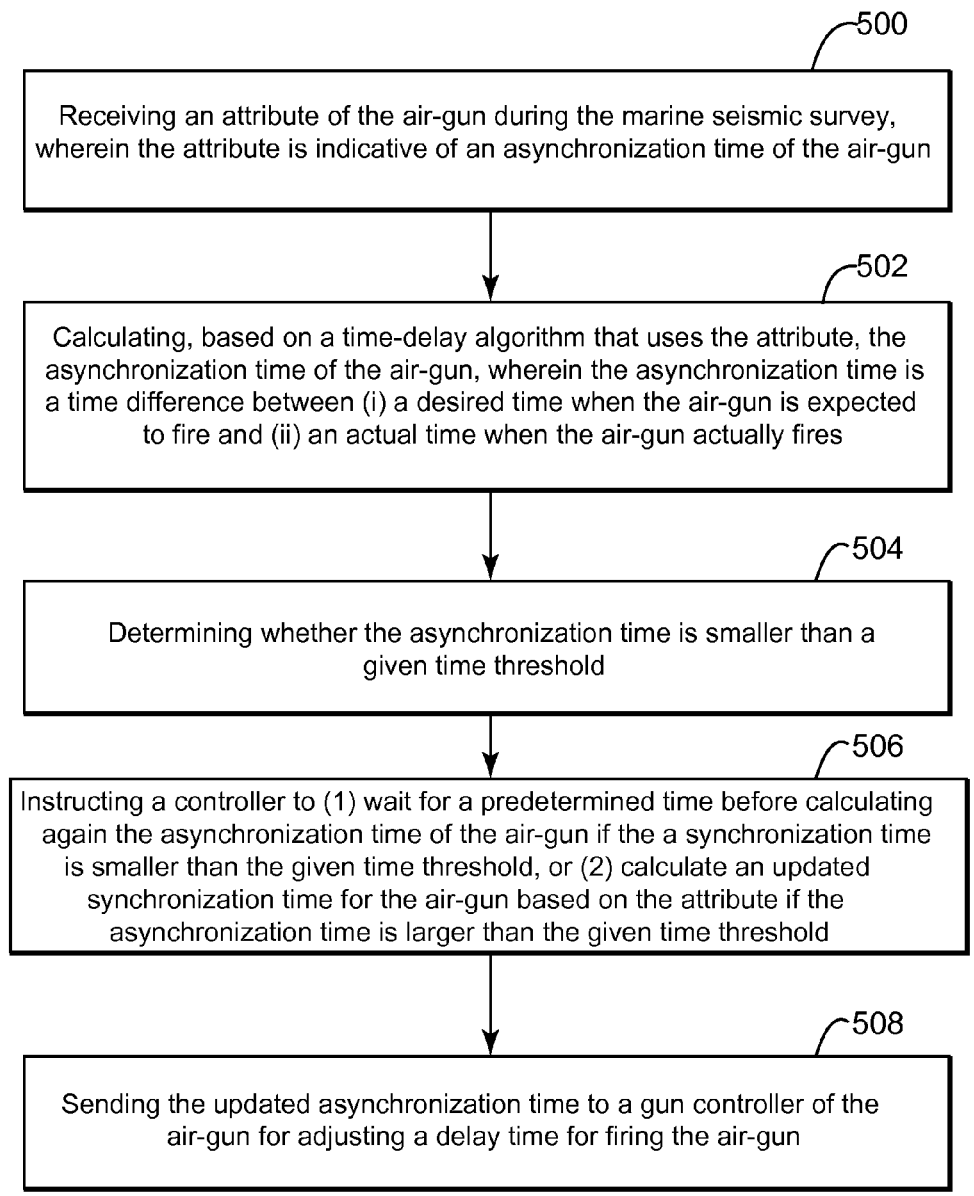
FIG. 5 is a flowchart of a method for updating a delay time of an air gun according to an embodiment.

A method for controlling a delay of an air-gun in a marine seismic source during a marine seismic survey is now discussed with regard to FIG. 5. The method includes a step 500 of receiving an attribute of the air-gun during the marine seismic survey, wherein the attribute is indicative of an asynchronization time of the air-gun; a step 502 of calculating, based on a time-delay algorithm that uses the attribute, the asynchronization time of the air-gun, wherein the asynchronization time is a time difference between (i) a desired time when the air-gun is expected to fire and (ii) an actual time when the air-gun actually fires; a step 504 of determining whether the asynchronization time is smaller than a given time threshold; a step 506 of instructing a controller to (1) wait for a predetermined time before calculating again the asynchronization time of the air-gun if the asynchronization time is smaller than the given time threshold, or (2) calculate an updated asynchronization time for the air-gun based on the attribute if the asynchronization time is larger than the given time threshold; and a step 508 of sending the updated asynchronization time to a gun controller of the air-gun for adjusting a delay time for firing the air-gun.

The above embodiments were discussed without specifying what type of seismic receivers is used to record the seismic data. In this sense, it is known in the art to use, for a marine seismic survey, streamers that are towed one or more vessels and the streamers include the seismic receivers. The streamers may be horizontal or slanted or having a curved profile as illustrated in FIG. 6.

Figure 6:
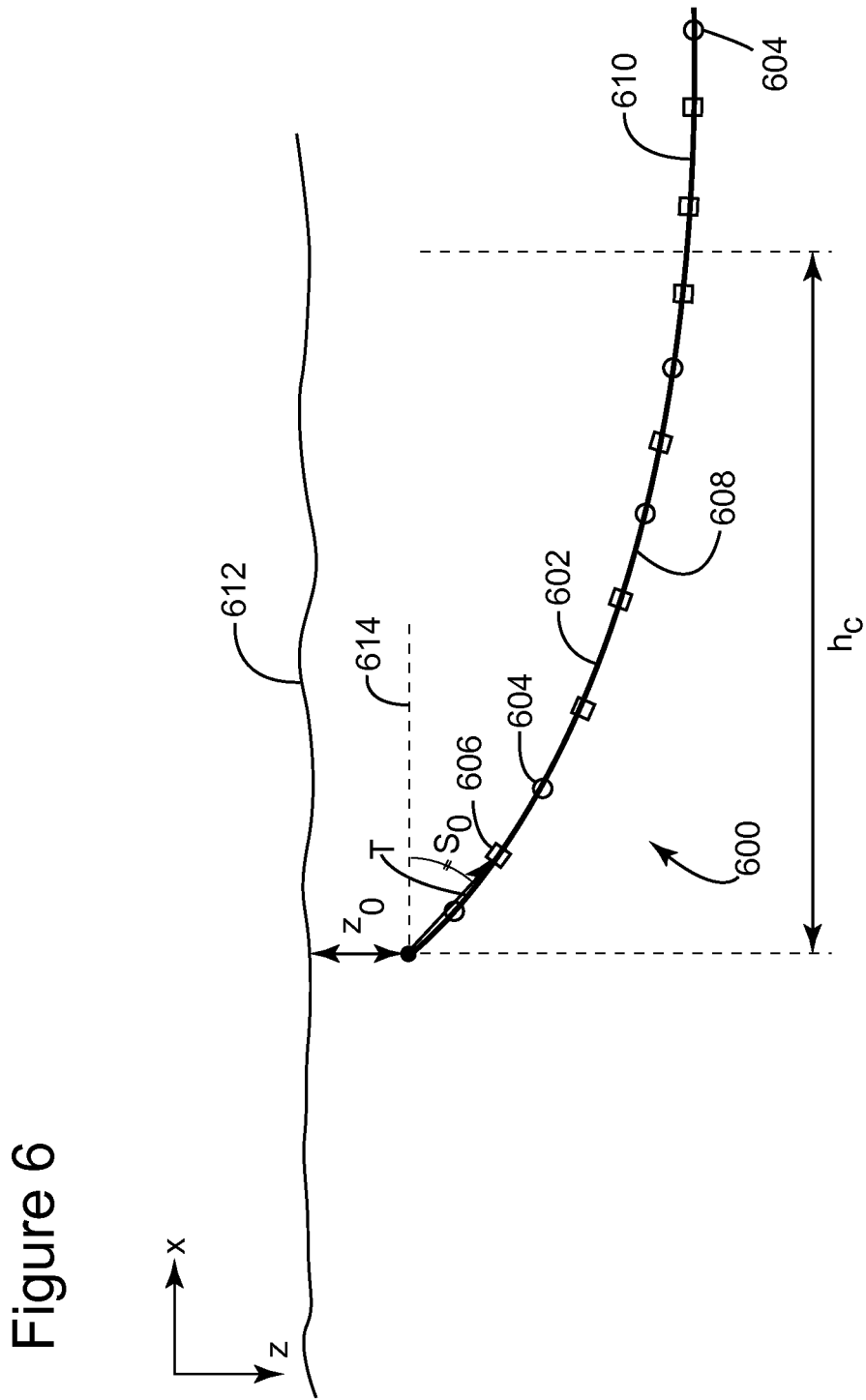
FIG. 6 illustrates a curved streamer.

The curved streamer 600 of FIG. 6 includes a body 602 having a predetermined length; plural detectors 604 provided along the body; and plural birds 606 provided along the body for maintaining the selected curved profile. The streamer is configured to flow underwater when towed such that the plural detectors are distributed along the curved profile. The curved profile may be described by a parameterized curve, e.g., a curve described by (i) a depth $z_0$ of a first detector (measured from the water surface 612), (ii) a slope $s_0$ of a first portion T of the body with an axis 614 parallel with the water surface 612, and (iii) a predetermined horizontal distance $h_c$ between the first detector and an end of the curved profile. It is noted that not the entire streamer has to have the curved profile. In other words, the curved profile should not be construed to always apply to the entire length of the streamer. While this situation is possible, the curved profile may be applied only to a portion 608 of the streamer. In other words, the streamer may have (i) only a portion 608 having the curved profile or (ii) a portion 608 having the curved profile and a portion 610 having a flat profile, the two portions being attached to each other.

Figure 7:
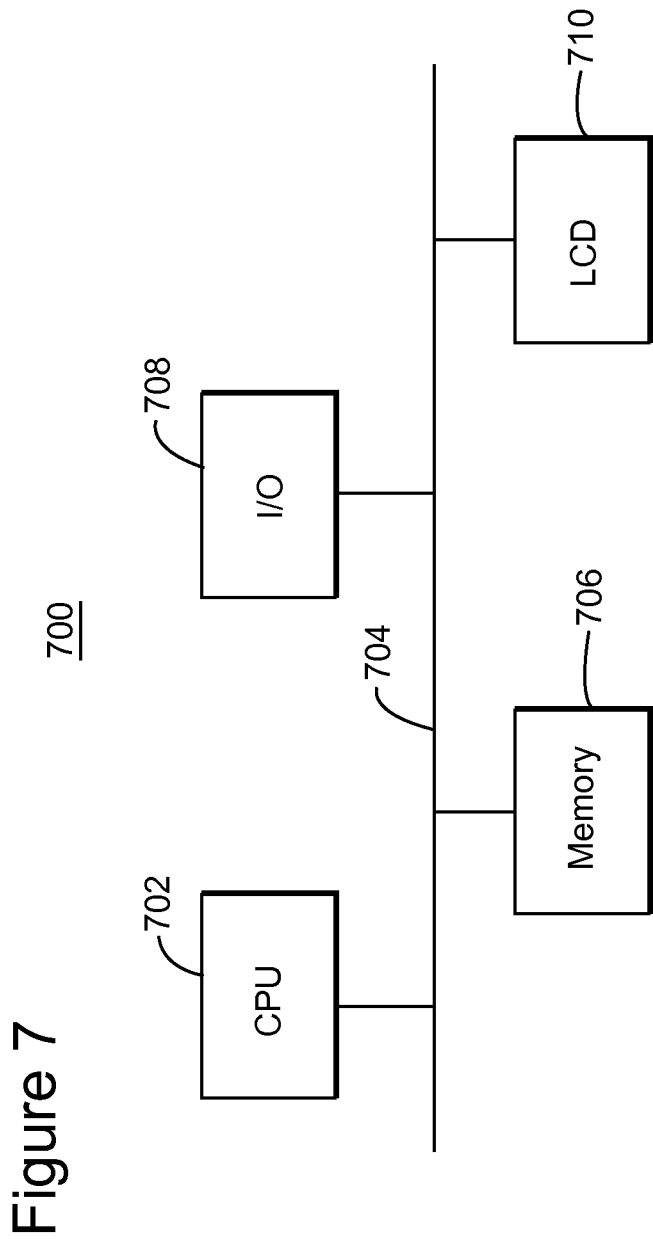
FIG. 7 illustrates a computing device for dynamically adjusting a delay time of an air gun.

An exemplary computing device is illustrated in FIG. 7. The computing device 700 includes a processor 702 that is connected through a bus 704 to a storage device 706. Computing device 700 may also include an input/output interface 708 through which data can be exchanged with the processor and/or storage device. For example, a keyboard, mouse or other device may be connected to the input/output interface 708 to send commands to the processor and/or to collect data stored in storage device or to provide data necessary to the processor. In one application, the processor calculates the distance d based on the time length of the actual record and the speed of light, which information may be provided through the input/output interface. Also, the processor may be used to process, for example, seismic data collected during the seismic survey. Results of this or another algorithm may be visualized on a screen 710.

The disclosed exemplary embodiments provide a method and system that use an attribute of an air-gun to adjust a delay time of the air-gun. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may combine hardware and software aspects. The exemplary embodiments may take the form of a computer-readable storage medium non-transitorily storing executable codes (i.e., a computer program) which when executed on a computer perform the above-described methods. Any suitable computer-readable medium may be utilized, including hard disks, CD-ROMs, digital versatile disc (DVD), optical storage devices, or magnetic storage devices such a floppy disk or magnetic tape. Other non-limiting examples of computer-readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for controlling a delay of an air-gun in an aquatic seismic source during an aquatic seismic survey, the method comprising:

firing the air-gun with a delay time;

receiving an attribute of the air-gun during the aquatic seismic survey, wherein the attribute is indicative of an asynchronization time of the air-gun;

calculating, based on a time-delay algorithm that uses the attribute, the asynchronization time of the air-gun, wherein the asynchronization time is a time difference between (i) a time when the air-gun is desired to fire according to a nominally designed time and (ii) an actual time when the air-gun actually fires;

determining whether the asynchronization time is within a given range;

instructing a controller to (1) wait for a predetermined time before calculating again the asynchronization time of the air-gun if the asynchronization time is within the range, or (2) calculate an updated asynchronization time for the air-gun based on the attribute if the asynchronization time is not within the range;

sending the updated asynchronization time to a gun controller of the air-gun for adjusting the delay time; and firing the air-gun using the adjusted delay time.

2. The method of claim 1, wherein the updated asynchronization time is set as $\tilde{\Delta t}_i = \text{sign}(\Delta T_i) * \Delta t$, where sign is the signum function and $\Delta t$ is a gun controller time resolution.

3. The method of claim 1, wherein the asynchronization time is calculated with a first time-delay algorithm and the updated asynchronization time is calculated with a second time-delay algorithm.

4. The method of claim 1, wherein the attribute is a near-field signature.

5. The method of claim 4, wherein the attribute further includes information about a position of the air-gun and a depth of the air-gun under water.

6. The method of claim 1, wherein a delay time of each air-gun of the seismic source is dynamically adjusted during the seismic survey.

7. The method of claim 6, wherein a first delay time of a first air-gun of the seismic source is dynamically adjusted with a different value than a second delay time of a second air-gun of the seismic source.

8. The method of claim 1, wherein the updated asynchronization time is a minimum adjustable time.

9. A computing device for controlling a delay of an air-gun in an aquatic seismic source during an aquatic seismic survey, the computing device comprising:

an interface for receiving an attribute of the air-gun during the aquatic seismic survey, wherein the attribute is obtained after firing the air-gun with a delay time and the attribute is indicative of an asynchronization time of the air-gun; and a processor connected to the interface and configured to, calculate, based on a time-delay algorithm that uses the attribute, the asynchronization time of the air-gun, wherein the asynchronization time is a time difference between (i) a time when the air-gun is desired to fire according to a nominally designed time and (ii) an actual time when the air-gun actually fires;

determine whether the asynchronization time is within a given range;

instruct the computing device to (1) wait for a predetermined time before calculating again the asynchronization time of the air-gun if the asynchronization time is within the given range, or (2) calculate an updated asynchronization time for the air-gun based on the attribute if the asynchronization time is not within the given range; and send the updated asynchronization time to a gun controller of the air-gun for adjusting the delay time so that the gun controller fires the air-gun using the adjusted delay time.

10. The computing device of claim 9, wherein the updated asynchronization time is set as $\tilde{\Delta t}_i = \text{sign}(\Delta T_i) * \Delta t$, where sign is the signum function and $\Delta t$ is a gun controller time resolution.

11. The computing device of claim 9, wherein the asynchronization time is calculated with a first time-delay algorithm and the updated asynchronization time is calculated with a second time-delay algorithm.

12. The computing device of claim 9, wherein the attribute is a near-field signature.

13. The computing device of claim 12, wherein the attribute further includes information about a position of the air-gun and a depth of the air-gun under water.

14. The computing device of claim 9, wherein a delay time of each air-gun of the seismic source is dynamically adjusted during the seismic survey.

15. The computing device of claim 14, wherein a first delay time of a first air-gun of the seismic source is dynamically adjusted with a different value than a second delay time of a second air-gun of the seismic source.

16. The computing device of claim 9, wherein the updated asynchronization time is a minimum adjustable time.

17. A computer readable media non-transitorily storing executable codes which when executed on a computer make the computer perform a method for controlling a delay of an air-gun in an aquatic seismic source during an aquatic seismic survey, the method comprising:

firing the air-gun with a delay time;

receiving an attribute of the air-gun during the aquatic seismic survey, wherein the attribute is indicative of an asynchronization time of the air-gun;

calculating, based on a time-delay algorithm that uses the attribute, the asynchronization time of the air-gun, wherein the asynchronization time is a time difference between (i) a time when the air-gun is desired to fire according to a nominally designed time and (ii) an actual time when the air-gun actually fires;

determining whether the asynchronization time is within a given range;

instructing a controller to (1) wait for a predetermined time before calculating again the asynchronization time of the air-gun if the asynchronization time is within the given range, or (2) calculate an updated asynchronization time for the air-gun based on the attribute if the asynchronization time is not within the given range; and sending the updated asynchronization time to a gun controller of the air-gun for adjusting the delay time so that the gun controller fires the air-gun using the adjusted delay time.

18. The medium of claim 17, wherein the updated asynchronization time is set as $\tilde{\Delta t}_i = \text{sign}(\Delta T_i) * \Delta t$, where sign is the signum function and $\Delta t$ is a gun controller time resolution.

19. The medium of claim 17, wherein the asynchronization time is calculated with a first time-delay algorithm and the updated asynchronization time is calculated with a second time-delay algorithm.

20. The medium of claim 19, wherein the attribute is a near-field signature.

* * * * *